United States Patent [19]

Noon

[11] Patent Number: 4,769,910
[45] Date of Patent: Sep. 13, 1988

[54] CUTTING TOOL FOR CYLINDRICAL ARTICLES

[75] Inventor: Laurence Noon, Saskatoon, Canada

[73] Assignee: Northern Telecom Limited, Montreal, Canada

[21] Appl. No.: 31,294

[22] Filed: Mar. 30, 1987

[51] Int. Cl.⁴ .............................................. B21F 13/00
[52] U.S. Cl. ...................................... 30/91.2; 29/2.16; 29/426.4; 30/90.1; 30/90.3
[58] Field of Search ...................... 30/90.4, 90.7, 90.9, 30/90.2, 92.5, 101, 91.2, 90.3; 81/9.41, 9.43; 29/2.16, 2.18, 2.19, 426.4

[56] References Cited

U.S. PATENT DOCUMENTS 3,082,523  3/1963  Modes et al. ........................ 30/90.4

Primary Examiner—Douglas D. Watts
Attorney, Agent, or Firm—R. J. Austin

[57] ABSTRACT

A cutting tool for a cable jacket having a circular blade for location on one side of the cable and two rollers for engagement on the other. The blade or the rollers are inclined to cause the blade to engage the jacket at an inclined angle to the longitudinal direction of the cable. This inclined cable causes the tool to move helically around the cable when the tool is rotated thereby providing a helical cut into the jacket.

4 Claims, 5 Drawing Sheets

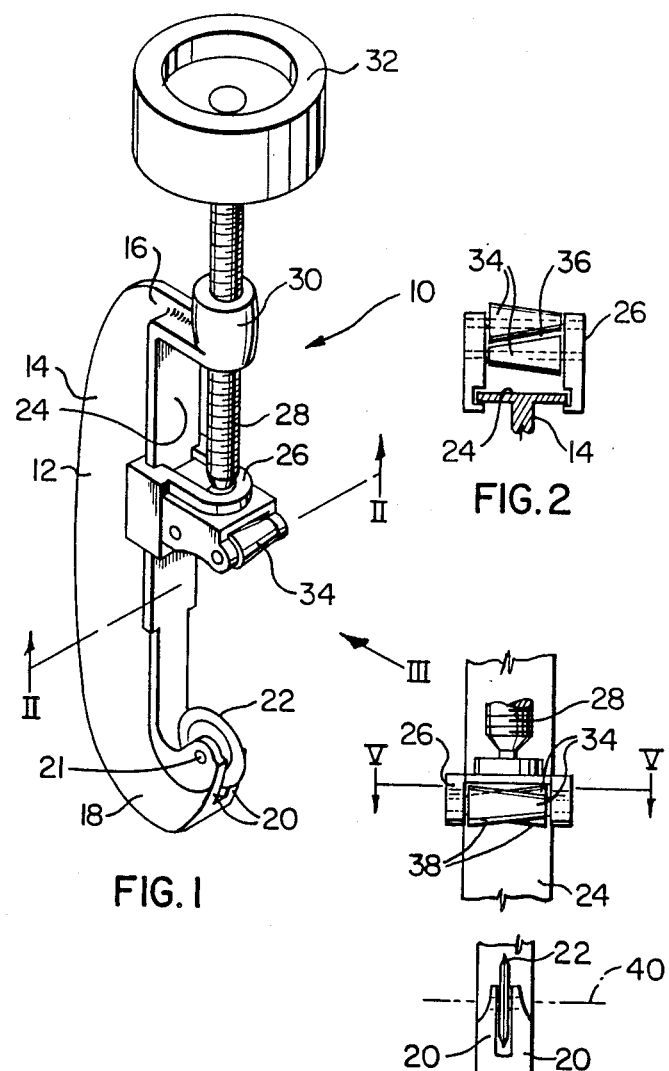

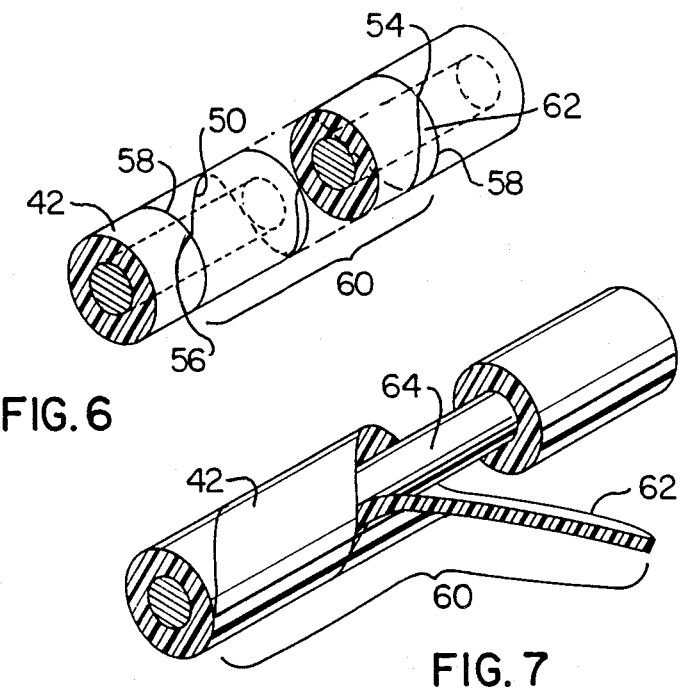
FIG. 6
FIG. 7
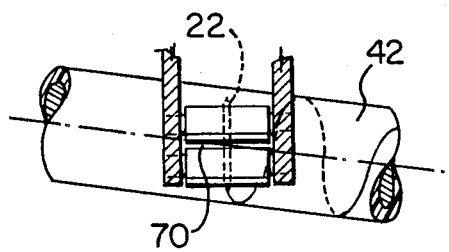
FIG. 10

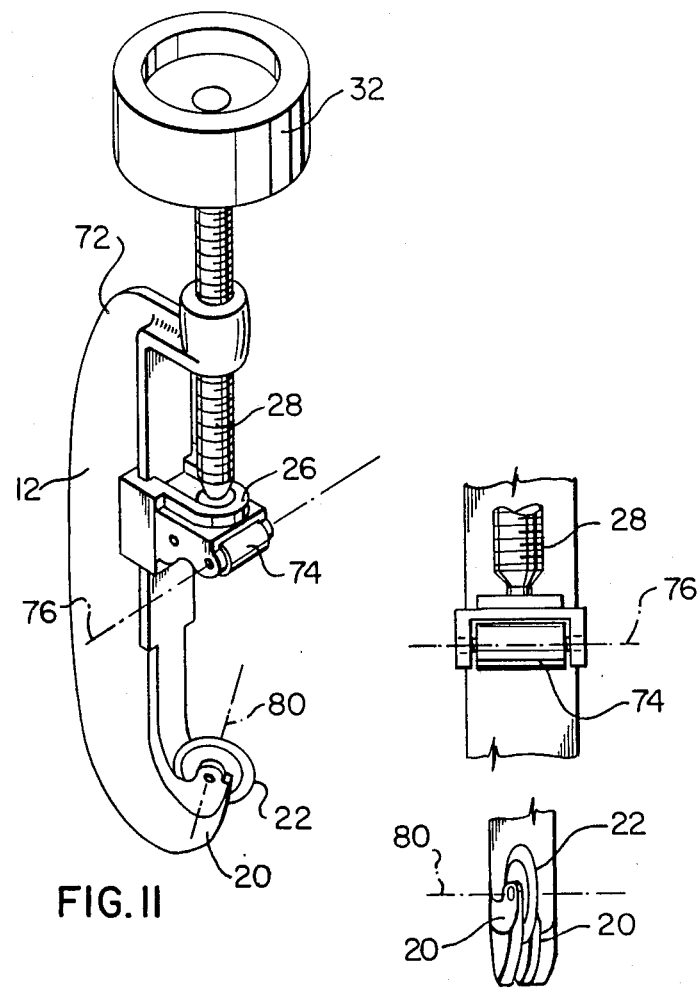
FIG. 11
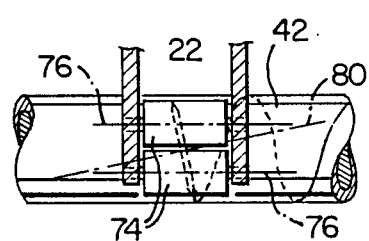
FIG. 12
FIG. 13

CUTTING TOOL FOR CYLINDRICAL ARTICLES

This invention relates to cutting tools for cutting around the periphery of cylindrical articles.

It is sometimes necessary to cut around the periphery of certain cylindrical articles as one step in the removal of surface layer of material. For instance, in the forming of splices in localized regions of a cable spaced from the cable ends it is necessary to remove the jacket of the cable and also the sheath if one exists, to enable the splicing operator to reach the cable core. Conventionally, the jacket material and shield is removed from the required region of the cable by using a pipe cutting tool having two cylindrical rollers mounted in a head held by a rigid tool holder and a circular cutting blade which is spaced from the head so as to lie on one side of the cable with the rollers on the other. With this arrangement, the cutting tool rolls around the cable so as to cause the blade to rotate and cut into the jacket and shield to provide a peripheral cut. Two spaced peripheral cuts are thus provided one at each end of the region of jacket material and sheath to be removed. The jacket material and sheath between the two peripheral cuts is then removed with extreme difficulty to expose the core lying beneath.

The present invention seeks to provide a cutting tool in the use of which the above jacket and sheath removal problem is minimized.

Accordingly, the present invention provides a cutting tool for cutting around the periphery of a cylindrical article comprising a circular blade and two lateral spaced rotatable article engaging rollers, the blade rotatable about an axis and, having a peripheral cutting edge, and the two rollers mounted about rotational axes in positions spaced from the blade with a progressively changing part of the peripheral surface of each roller opposing the cutting edge of the blade, as the rollers are rotated, to enable the cylindrical article to be positioned between and in rolling contact with the rollers and with the cutting blade, and the relative orientation of the blade and of the said peripheral surface parts of the rollers being such as to cause the tool to hold the cylindrical article with the blade lying at a bias angle to the longitudinal direction of the article.

In a preferred cutting tool according to the invention, the peripheral surface part of each roller is inclined towards the rotational axis of the blade in a direction from end-to-end of the roller and the direction of inclination of the peripheral surface part of one roller is opposite to that of the other roller. With this preferred arrangement, each roller is frusto-conical and the cable is engaged by the frusto-conical rollers with the longitudinal direction of the cable being parallel to the direction of a gap existing between the two rollers. Alternatively, the two rollers are cylindrical and the axis of rotation of each roller is inclined towards the axis of rotation of the blade with one roller inclined oppositely with respect to the other. The rollers contact the cable along their lengths by having the axes of the rollers inclined relative to the longitudinal direction of the cable. As a result, the blade contacting the cable at a different part of the periphery, lies at a bias angle to the longitudinal direction of the cable.

It is not essential for the rollers to be of frusto-conical shape or to have inclination of their axes to achieve a cutting tool according to the invention. For instance, in a further arrangement, each roller is cylindrical and the rollers have rotational axes which lie parallel and in a common plane. With this arrangement, the rotational axis of the blade lies parallel to the common plane but also lies at an angle to the rotational axes of the rollers when considered in a direction normal to the common plane. In use of this arrangement, the rollers contact the cable, the cable extending, in its longitudinal direction, substantially parallel to the axes of the rollers. However, because of the angle of inclination of the blade axis, then the blade must lie at a bias angle to the cable.

With cutting tools according to the invention, it has been found that in use, rotation of the tool causes the cutting blade to rotate around the cable in a direction which at any instant lies normal to the blade axis. Thus the shape or angle of inclination of the rollers do not dictate a particular path followed by the tool around the cable. This path is dictated solely by the blade itself and the rollers merely position the blade at the bias angle upon the article to enable the cutting action to take place by helical movement of the blade around the article.

Embodiments of the invention will now be described, by way of example, with reference to the accompanying drawings, in which:

FIG. 1 is an isometric view of a cutting tool according to a first embodiment for cutting around the jacket of a cable;

FIG. 2 is a cross-sectional view through the cutting tool taken along line II—II in FIG. 1;

FIG. 3 is a front view of part of the tool taken in the direction of arrow III in FIG. 1;

FIG. 6 is an isometric view showing the cable after a cutting operation has been completed;

FIG. 7 is a view similar to FIG. 6 showing the method of removal of jacket and sheath material from the cable;

FIG. 10 is a cross-sectional view through the cutting tool of the second embodiment taken along line X—X in FIG. 9;

FIG. 11 is a view similar to FIG. 1 of a tool according to a third embodiment;

FIG. 12 is a front view of the tool of the third embodiment taken in the direction of arrow XII in FIG. 11; and FIG. 13 is a cross-sectional view similar to FIG. 10 showing the cutting tool of the third embodiment in use.

Figure 4:
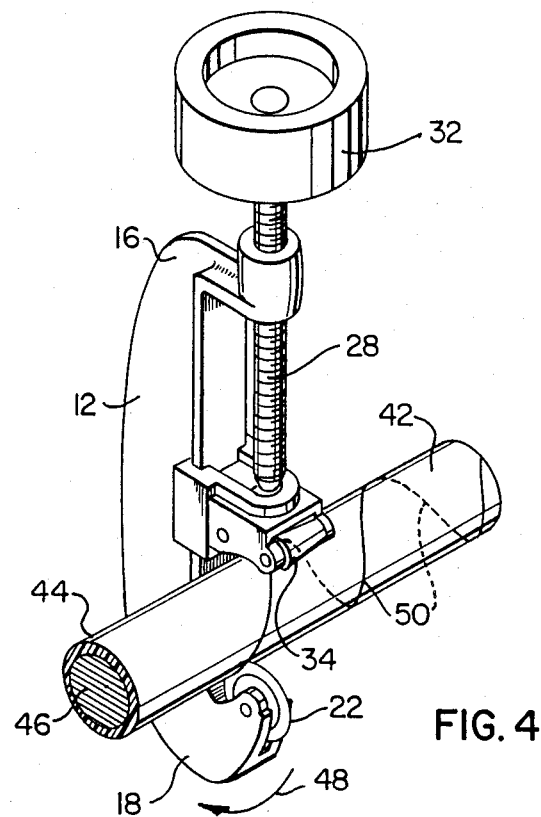
FIG. 4 is a view similar to FIG. 1 showing the tool of the first embodiment during a cutting action upon cable.

In a first embodiment of the invention as shown in FIG. 1, a cutting tool 10 for cutting helically through the jacket and shield of a cable comprises a rigid tool holder 12. The tool holder 12 basically comprises a metal plate 14. Upper and lower ends 16 and 18 of the holder turn in the same direction of a main part of the plate. The lower end 18 is thicker than the plate to provide bifurcated bearing arms 20 holding a trunnion 21 which rotatably carries a circular blade 22. The blade is thus mounted with its rotational axis substantially normal to the plane of the plate. The plate 14 carries a flange plate 24 extending normal to the plane of the plate and along the edge of the plate between the upper and lower ends 16 and 18. This flange plate 24 acts as a guide for a roller carrying head 26 which is slidably mounted upon the flange plate in a position between the upper and lower ends and for vertical movement between these ends. Movement of the head is controlled by an adjusting screw 28 which is rotatably mounted at one end into the head, is carried in screw-threaded engagement through a screw-threaded extension 30 of the upper end 16, and is provided at its other end with a knob 32 secured to the shaft to allow for manual operation.

The cutting tool is also provided with a pair of laterally spaced rotatable rollers 34 for engaging the peripheral surface of the cable to hold the cutting tool in a desired position during a cutting operation. As can be seen from FIGS. 1 and 2, the two rollers 34 are mounted about parallel axes in the head 26 and each roller is of frusto-conical shape (see particularly FIG. 2). As can be seen from FIG. 2, the rollers lie side-by-side and taper in opposite directions from one side to the other of the head. With this arrangement, a gap 36 is defined between the two rollers and this gap lies at an angle to the axes of rotation of the rollers, the angle decided by the angle of taper of each roller. The configuration and relative positioning of the rollers is such that, as can be seen from FIG. 3, the rollers have lower peripheral surface parts 38 which are inclined towards the rotational axis 40 of the blade 22 in a direction from end-to-end of the rollers and the direction of inclination of one peripheral surface part 38 is opposite to that of the other.

The cutting tool of the first embodiment is designed so that the relative orientation of the blade and the peripheral surface parts of the rollers are such as to cause the rollers to hold the cable with the blade lying at a bias angle to the longitudinal direction of the cable. This is clear from a consideration of the operation of the cutting tool 10 in use. As can be seen from FIG. 4, the cutting tool 10 is mounted upon a cable 42 with the cable disposed between the rollers 34 on the one side and blade 22 on the other side. The roller carrying head is manually positioned so that the cable is gripped between the rollers and the cutting edge of the blade with the blade embedded into the cable for a sufficient distance to cut into the jacket and sheath 44. As represented in FIG. 4 and all other figures, the jacket and sheath are shown as one item to simplify the drawings. The jacket and sheath surround a central core 46 comprising a plurality of pairs of individually insulated conductors which it is desired to splice to conductors of another cable.

Figure 5:
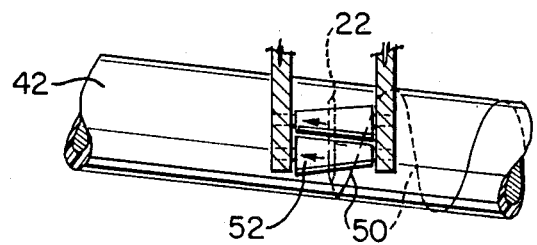
FIG. 5 is a cross-sectional view though part of the tool of the first embodiment taken along line V—V in FIG. 4 and showing the tool in use.

In view of the shape and relative positioning of the rollers 34, the rollers will only engage the cable in a secure and stable fashion by the location of the cable with its longitudinal direction extending substantially parallel to the length of the gap 36. This is as shown by FIG. 5. Of course, with this positioning of the rollers and cable, this effects a twisting of the cutting tool away from a normal position to the cable and into a bias position, in the view in FIG. 5, in which the blade 22 also lies at a bias angle to the longitudinal direction of the cable. To provide a cut into and around the cable jacket and sheath, it is necessary to rotate the tool around the cable. As shown in FIG. 4, with the tool rotating in a clockwise direction indicated by arrow 48, the actual path of movement of the tool is dictated by the cutting blade 22 and its angle of inclination to the longitudinal direction of the cable. Thus the tool proceeds around the cable in a helical fashion and as it does so, the cutting blade 22 provides a helical cut 50 through the jacket and sheath 44. It is interesting to note that surprisingly the rollers 34 themselves do not actually dictate the path of movement of the cutting tool around the cable, but merely decide the angular position of the cutting blade relative to the longitudinal direction of the cable as shown in FIG. 5. In contrast to the rollers deciding on the actual path of movement of the cutting tool around the cable, the rollers are forced to take a path other than produced by a normal rolling movement upon the surface of the cable. The rollers do roll but also move along the cable in the axial direction of the rollers indicated by arrows 52 in FIG. 5. This combined rolling action and lateral motion of the rollers produces a rolling and sliding component of roller movement which lies at an angle somewhere between the axial direction of the rollers and a path normal to it.

Hence, it can be seen that the rollers merely position the cutting blade upon the cable 42 and the cutting blade decides the path of movement of the tool to provide the helical cut. If the helical cut is commenced at position 54, for instance in FIG. 6, and proceeds along the cable to its other end at position 56, then two circumferentially extending cuts 58, lying normal to the longitudinal direction of the cable, may be provided in known manner with these cuts passing through the helical cut 50 preferably at or close to the positions 54 and 56. Once these cuts have been completed, then a helix 60 of cable jacket and sheath extends along the cable between the cuts 58 and this may be removed simply by gripping one end 62 of the helix 60 and unwrapping it from around the core as shown in FIG. 7. Removal may take place by holding the end 62 with a gripping tool such as pliers and unwinding it in the direction of the cut 50. The unwinding action continues until the position 56 is reached and the helical portion 60 is then removed. A part 64 of the core is then exposed as shown by FIG. 7 to enable a branch splicing operation to be performed.

As can be seen from the above description, the cutting tool of the first embodiment enables a length of cable jacket and/or sheath to be removed from cable intermediate the cable ends in a simple and non-arduous fashion for any required purpose. The cutter is simple to operate and easily provides a helical cutting action which produces an easily removed helical portion of jacket and/or sheath. Thus, previous problems associated with removal of sections of cable jacket and sheath are minimized.

In further embodiments, now to be described, parts having the same design and function as in the first embodiment, will carry like reference numerals.

Figure 8:
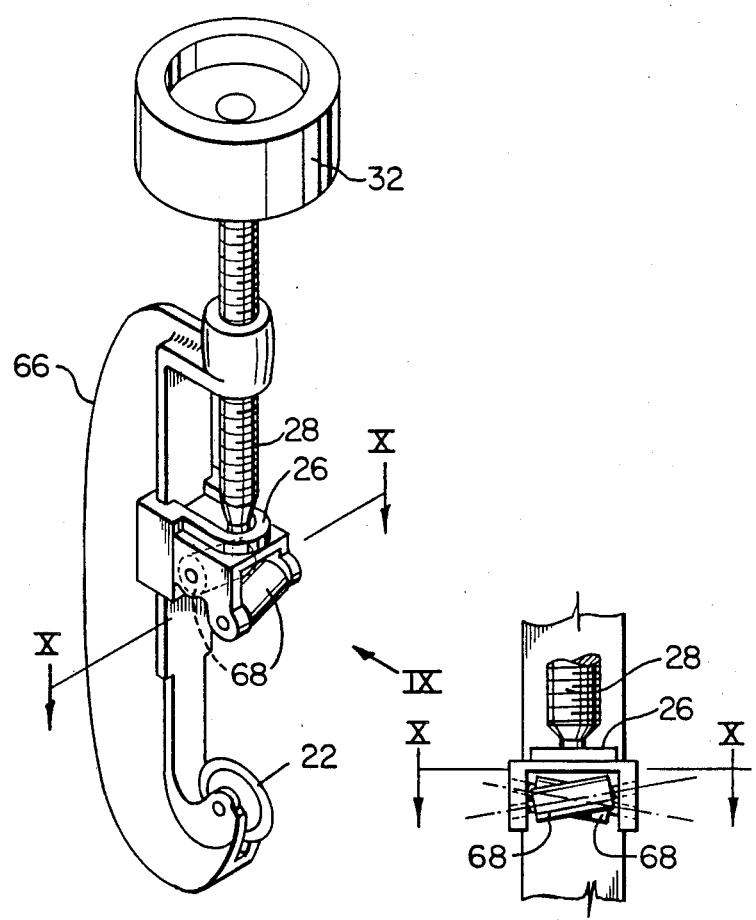
FIG. 8 is a view similar to FIG. 1 of a tool according to a second embodiment.
Figure 9:
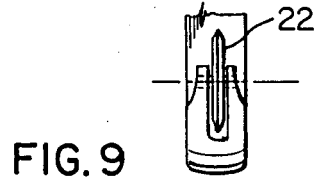
FIG. 9 is a front view of the tool of the second embodiment taken in the direction of arrow IX in FIG. 8.

In a second embodiment as shown in FIGS. 8, 9 and 10, a cutting tool 66 is of similar construction to that of the first embodiment except for the shape and positioning of its rollers. The cutting tool 66 has two cylindrical rollers 68 which are laterally spaced, but as can be seen from Figure 9, the axis of rotation and the lower surface part of one roller are inclined in the opposite direction to that of the other roller.

In use of the cutting tool of the second embodiment, as can be seen from FIG. 10, when the tool is applied to a cable 42, the cable automatically assumes a stable position in which it engages the two rollers 68 with the longitudinal direction of the cable inclined both to the rotational axes of the rollers and also to a gap 70 between them. As can be seen from FIG. 10, the cutting blade 22 is disposed at a bias angle as controlled by the positioning of the cable with respect to the rollers. The cutting tool is then rotated to cause a helical cutting motion of the cutting blade in a similar manner to that described in the first embodiment. The cutting blade dictates the actual movement of the tool during the cutting action and the rollers merely act to hold the cutting blade in its bias position. The cutting action is completed and a length of cable jacket and sheath are removed in a manner similar to that described in the first embodiment.

In a third embodiment illustrated in FIGS. 11, 12 and 13, a cutting tool 72 differs from that of the first embodiment in the shape and positioning of its rollers 74 and also in the disposition of its cutting blade 22. As seen particularly from FIGS. 12 and 13, the rollers 74 are cylindrical and lie side-by-side with their axes 76 in parallel relationship in all planes. In the front elevational view of FIG. 12, the rotational axes 76 of the rollers and the rotational axis 80 of the cutting blade 22 are parallel. However, in a view normal to the front view, i.e. as shown in FIG. 13, the rotational axis 80 of the cutter blade 22 lies at an angle to the axes of the rollers. This is because the lower end 18 of the tool holder 12 is turned from its plane to dispose the bearing arms 20 at that angle.

In use, as can be seen from FIG. 13 and with the cable located in a stable position between rollers and cutting blade, the rollers have their axes 76 lying substantially parallel to the longitudinal direction of the cable. However, as in the previous embodiments, the cutting blade 22 is held at a bias angle upon the cable. The operation of this cutting tool is similar to that described in the first embodiment and produces a helical cut around the cable thereby enabling a helical portion of the jacket and sheath to be removed with minimum difficulty in the manner described in the first embodiment.

In all of the above embodiments, the cutting blade is shown as rotatable about a fixed axis with the rollers adjustable in position towards and away from the blade. However, this arrangement is not essential. Alternatively, in a modification (not shown) of each embodiment, the rollers and cutting blade are reversed in their positions, with the rollers mounted about fixed rotational axes at the lower end 18 of the tool holder and the cutting blade is rotatable upon a blade carrying head which replaces the roller carrying head of the embodiment. In the modification, the blade carrying head is adjustable in position upon a guide, e.g. similar to flange plate 24, by a knob.

What is claimed is:

1. A cutting tool for cutting around the periphery of a cylindrical article comprising a circular blade and two laterally spaced rotatable article engaging rollers, the blade rotatable about an axis and having a peripheral cutting edge, and the two rollers mounted about rotational axes in positions spaced from the blade with a progressively changing part of the peripheral surface of each roller opposing the cutting edge of the blade, as the rollers are rotated, to enable the cylindrical article to be positioned between and in rolling contact with the rollers and with the cutting blade, said peripheral surface part of each roller being inclined towards the rotational axis of the blade in a direction from end-to-end of the roller and with the direction of inclination of said peripheral surface part of one roller being opposite to that of the other roller such as to cause the tool to hold the cylindrical article with the blade lying at a bias angle to the longitudinal direction of the article.

2. A cutting tool according to claim 1 wherein each roller is frusto-conical.

3. A cutting tool according to claim 1 wherein the rotational axes of the blade and of the two rollers are parallel and each roller is frusto-conical.

4. A cutting tool according to claim 1 wherein each roller is cylindrical and its axis of rotation and its peripheral surface part are inclined towards the axis of rotation of the blade and the direction of inclination of the axis of one roller is opposite to that of the other roller.

* * * * *